United States Patent [19]

Tani

[11] 4,077,812

[45] Mar. 7, 1978

[54] METHOD OF WORKING STEEL MACHINE PARTS INCLUDING MACHINING DURING QUENCH COOLING

[75] Inventor: Hajime Tani, Kuwana, Japan

[73] Assignee: NTN Toyo Bearing Co. Ltd., Osaka, Japan

[21] Appl. No.: 669,146

[22] Filed: Mar. 22, 1976

[30] Foreign Application Priority Data

Mar. 25, 1975 Japan .................................. 50-36291
Mar. 25, 1975 Japan .................................. 50-36292
Mar. 25, 1975 Japan .................................. 50-36293

[51] Int. Cl.$^2$ .......................... C21D 1/20; C21D 1/22
[52] U.S. Cl. ..................................... 148/12.4; 148/36; 148/39
[58] Field of Search ....................... 148/12.4, 134, 143, 148/144, 12 F, 36, 39

[56] References Cited
U.S. PATENT DOCUMENTS

| | | | |
|---|---|---|---|
| 2,717,846 | 9/1955 | Harvey | 148/12.4 |
| 3,281,287 | 10/1966 | Edstrom et al. | 148/12.4 |
| 3,386,862 | 6/1968 | Johnston et al. | 148/12.4 |
| 3,425,877 | 2/1969 | Deacon | 148/12.4 |
| 3,535,910 | 10/1970 | Connolly | 148/12.4 |
| 3,752,709 | 8/1973 | Zackay et al. | 148/12.4 |

*Primary Examiner*—W. Stallard
*Attorney, Agent, or Firm*—Hall & Houghton

[57] ABSTRACT

The invention provides a method of working steel machine parts, and it relates to a composite technique consisting of machining and heat-treatment, which makes use of the fact that at temperatures in the vicinity of or above the Ms point during quench cooling, the structure of steel assumes a state of supercooled austenite or a portion thereof assumes a state of martensite transformation or beinite transformation, suitable for machining, and in such state desired machining is applied to steel machine parts, which are then cooled to room temperature for hardening. Other merits and details will be made clear.

7 Claims, 13 Drawing Figures

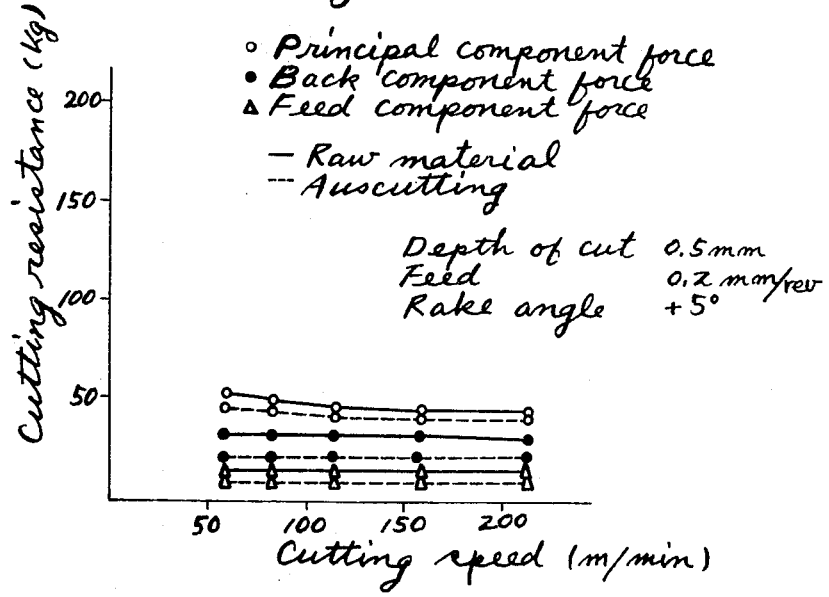
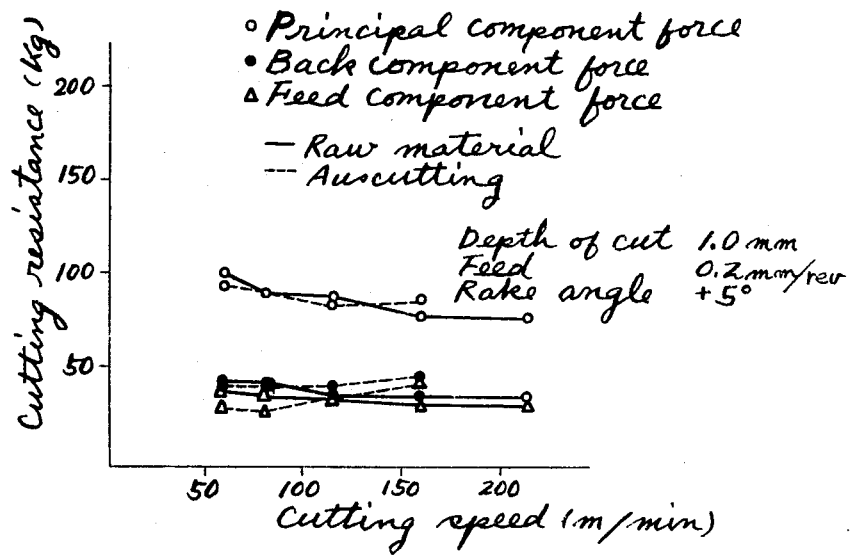

METHOD OF WORKING STEEL MACHINE PARTS INCLUDING MACHINING DURING QUENCH COOLING

BACKGROUND OF THE INVENTION a. Field of the Invention

The present invention relates to a method of working steel machine parts including machining during quench cooling, and more particularly it relates to a composite tequnique consisting of machining and heat-treatment.

b. Description of the Prior Art

In general, the cutting of quench hardened steel machine parts is very difficult because of their high hardness. In some cases, turning of steel machine parts is performed by using cemented carbide cutting tools or ceramic tools, but the very low machinability of the parts results in the generation of heat, which, undesirably, often changes part of the steel structure. As a measure for avoiding this adverse effect, grinding, electrolytic working or spark-pressure working is employed. However, these working processes are low in working quality and requre a long period of time for a given working operation with a fixed amount to be cut, thus being inefficient. In order to increase productivity, the usual method adopted by manufacturers, though a roundabout way, is to effect cutting, such as turning, prior to quenching, and then effect quench hardening, which is followed by working such as grinding.

On the other hand, when the quenching process of steel is considered, it is seen that, as shown in FIGS. 1 and 2, it is within a relatively low-temperature region below the Ms point that quench hardening commences. In a higher-temperature region, the structure of steel is in a supercooled austenite state and its hardness is considerably low as compared with that when it is in a martensite state. Therefore, it is conceivable that its machinability in this temperature region is naturally improved. A known example of working in this supercooled austenite state is ausforming (plastic working). Since it serves for the strengthening of steels, it has been substantially studied, both scholarlily and technically, and is increasingly used.

SUMMARY OF THE INVENTION

A first form of the present invention has been developed in the course of researches about the above described prior art, and particularly it relates to a composite technique consisting of heat-treatment and machining, intended for machining steel machine parts in the supercooled austenite region during quench cooling. Thus, we have found through tests for machining of various steels that the machining of steels in the supercooled austenite region is possible even if they are not high-carbon steels generally known as ausforming-oriented steels but are low-carbon steels, such as shaft bearing steels, and we have estabished technical facts supporting this technique. In addition, the machining as mentioned herein includes cutting and plastic working. Further, the cutting includes turning and grinding, while the plastic working includes forging and rolling.

A second form of the present invention relates to a composite technique consisting of heat-treatment and cutting, performed in a line subsequent to forge quenching, wherein a steel machine part after being plastic worked is subjected to isothermal retention at 700°–850° C for spheroidigation of cementite on the way of continuous cooling and then to uniform heating to 800°–900° C, which is regarded as the quenching temperature, and cutting is performed in the supercooled austenite region in the course of quench cooling.

A third form of the present invention relates to a composite technique consisting of heat-treatment, plastic working (ausforming) and cutting (auscutting), wherein the plastic working and cutting of steel machine parts are performed in the course of quench cooling, thereby achieving precision finish.

FEATURES OF THE INVENTION

According to the present invention, a steel machine part uniformly heated to the predetermined quenching temperature in accord with the kind of steel, i.e, the quenching temperature in the austenite region above the A1 transformation point is quickly cooled in a cooling medium to a temperature in the vicinity of or above the Ms point, and cutting is performed with the structure of the steel maintained in the supercooled austenite state or a portion thereof undergoing martensite transformation or beinite transformation, and finally the machine part is cooled to room temperature to complete hardening. Therefore, the invention is highly advantageous in materials saving, energy saving and labor saving. Further, descaling by shot blast is no longer necessary, and the large-scale equipment, such as a quenching furnace and annealing furnace and the costly equipment, such as a quenching press, can be dispensed with. Further, the process can be line-sy systemized to achieve high economic advantages, including the reduction of the quantity of half-finished parts, office work costs and transportation costs.

Further, according to the present invention, a steel blank heated to 950°–1,300° C is formed into a steel machine part by forging, rolling or other plastic working process, and in the course of continuous cooling thereof from the forging or rolling temperature, where necessary, it is subjected to isothermal retention at 700°–850° C for spheroidization of cementite, then to uniform heating to the predetermined quenching temperature in accord with the kind of steel, and when it is quench cooled in a cooling medium for the quenching temperature, the cooling is interrupted in the vicinity of the Ms temperature and cutting is performing while effecting air cooling or warmth retention, and finally it is either cooled to room temperature or allowed to undergo beinite transformation and then cooled to room temperature. Thus, in quench cooling, the cooling is interrupted at a temperature preceding the temperature at which hardening takes place, and then cutting is performed. As a result, by only applying heating necessary for hot forging or rolling, it is possible to continuously carry out spheroidization annealing in the course of cooling from this temperature, cutting, quench hardening and aging treatment, while achieving the same merits as those of the first form of the invention.

Further, subsequent to the so-called ausforming wherein a steel blank uniformly heated to the predetermined quenching temperature in accord with the kind of steel is quickly cooled in a cooling medium from this quenching temperature and is then subjected to forming by plastic working before quench hardening commences, cutting is performed in the supercooled austenite state and finally the machine part is either cooled to room temperature or subjected to isothermal retention for a suitable period of time and then cooled to room temperature to complete hardening. As a result, there is obtained a steel machine part with a minimum amount to be ground. Thus, the invention increases productivity and is also highly advantageous from the standpoint of economics, while achieving the same merits as those of the first form of the invention.

BRIEF DESCRIPTION OF THE DRAWINGS

FIGS. 3 through 7 are views for explanation of a first form of the present invention; FIG. 3 shows a thermal handling process conventionally employed with respect to shaft bearing steel, in terms of relationship between temperature and time; FIG. 4 shows a thermal handling process according to the present invention, in terms of relationship between temperature and time; FIGS. 5 through 7 show results obtained when shaft bearing steel Class 3 is turned in the supercooled austenite region and an annealed material (raw material) of shaft bearing steel Class 3 is turned at room temperature and under the same cutting conditions, these Figures depicting the principal component force, feed component force and back component force acting on a tool, for different depths of cut;

FIG. 8 shows the result of measurement by X-rays of the residual stress in the surface layer of a quenched steel ground article according to the present invention, while FIG. 9 shows the result of measurement by X-rays of the residual stress in the surface layer of a conventional quenched steel ground article;

FIG. 10 shows a thermal handling process conventionally employed with respect to shaft bearing steel, in terms of relationship between temperature and time, while FIG. 11 shows a thermal handling process according to the invention, in terms of relationship between temperature and time;

FIG. 12 shows a thermal handling process conventionally employed with respect to shaft bearing steel, in terms of relationship between temperature and time, while FIG. 13 shows a thermal handling process according to the present invention, in terms of relationship between temperature and time.

DESCRIPTION OF THE PREFERRED EMBODIMENTS

First Form of The Invention

Cooling in the course of quenching of a steel machine part made of shaft bearing steel Class 3 (SUJ-3) was interrupted and cutting was performed in the supercooled austenite region. As a result of this cutting experiment, this steel machine part exhibited machinability which compared well with that of an annealed material. When it was further cooled to room temperature, a high hardness of above Rockwell C 60 was obtained. In addition, since the cutting is performed in the austenite region, it is hereinafter referred to as auscutting.

The conventional process requires heating and cooling processes many times as follows: (steel machine part) → (annealing) → (turning) → (quenching) → (tempering) → (turning) or (steel machine part) → (annealing) → (turning) → (cold forging) → (annealing) → (turning) → (quenching) → (tempering) → (turning).

In contrast, in the auscutting method according to the present invention, the required processes are: (steel machine part) → (quick cooling after uniform heating) → (auscutting) → (tempering) → (turning). This provides remarkable improvements as seen in FIGS. 3 and 4 in which the conventional and present methods are depicted in terms of temperature cycles.

Figure 1:
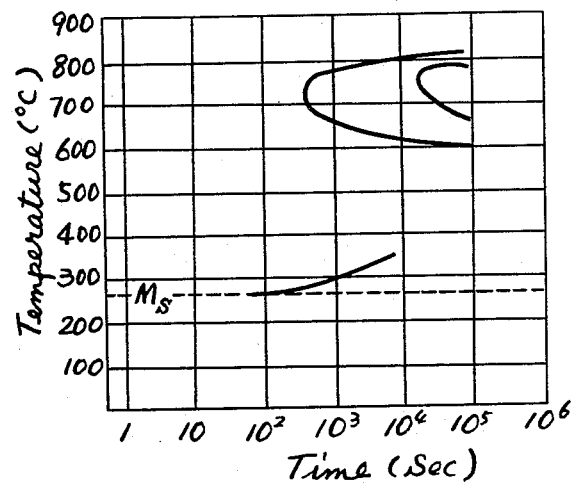
FIG. 1 is an isothermal transformation diagram for quenching of SKD-6 steel regarded as suitable for plastic working in the supercooled austenite region.
Figure 2:
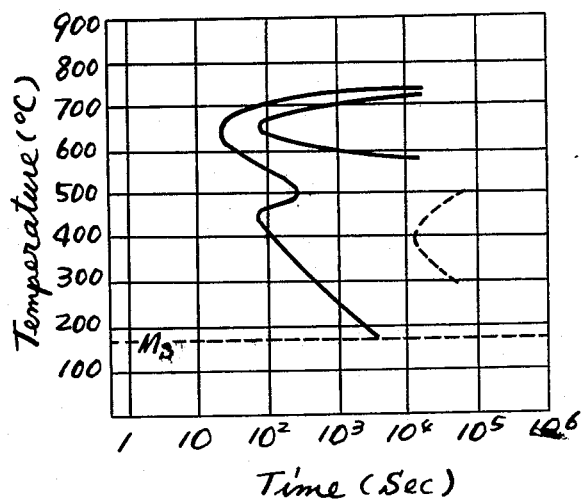
FIG. 2 is an isothermal transformation diagram for quenching of shaft bearing steel Class 3 (SUJ-3)
Figure 3:
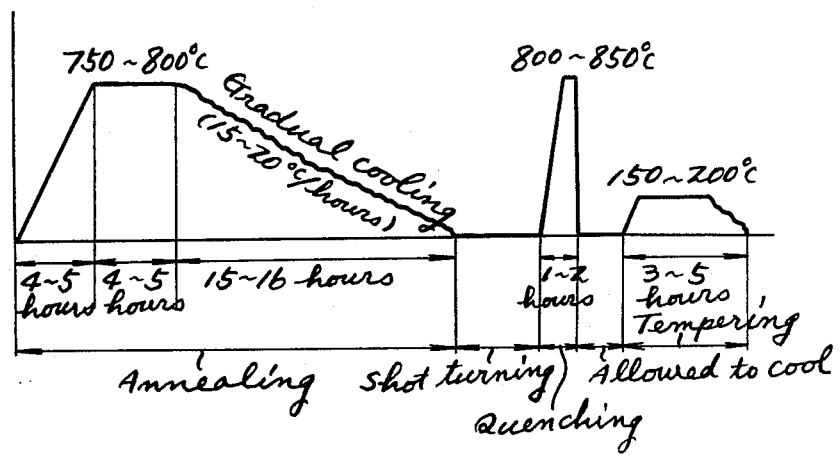
Figure 4:
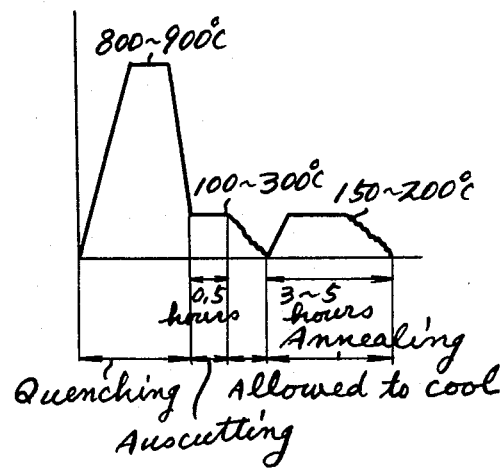

In the conventional temperature cycle shown in FIG. 3, the steel machine part is uniformly heated to 750°-800° C taking 4-5 hours, retained at this temperature for 4-5 hours, annealed by being gradually cooled for 15-16 hours at a rate of 15°-20° C per hour, shot turned, quenched at 800°-850° C for about 1-2 hours, allowed to cool, and tempered at 150°-200° C for 3-5 hours. In contrast, in the temperature cycle according to the present invention shown in FIG. 4, the steel machine part is uniformly heated to a quenching temperature of 800°-900° C in the austenite region above the A1 transformation point, quickly cooled in a cooling medium to a temperature of 100°-300° C in the vicinity of or above the Ms point, turned (auscut) at this temperature which is retained for about 30 minutes, allowed to cool, and tempered at 150°-200° C for 3-5 hours. In addition, it goes without saying that instead of reheating for tempering subsequent to cooling to room temperature, as shown in FIG. 4, the auscutting may be followed by isothermal transformation for obtaining a beinitic structure.

A concrete experimental example of the above will now be described with reference to an instance of turning.

Figure 7:
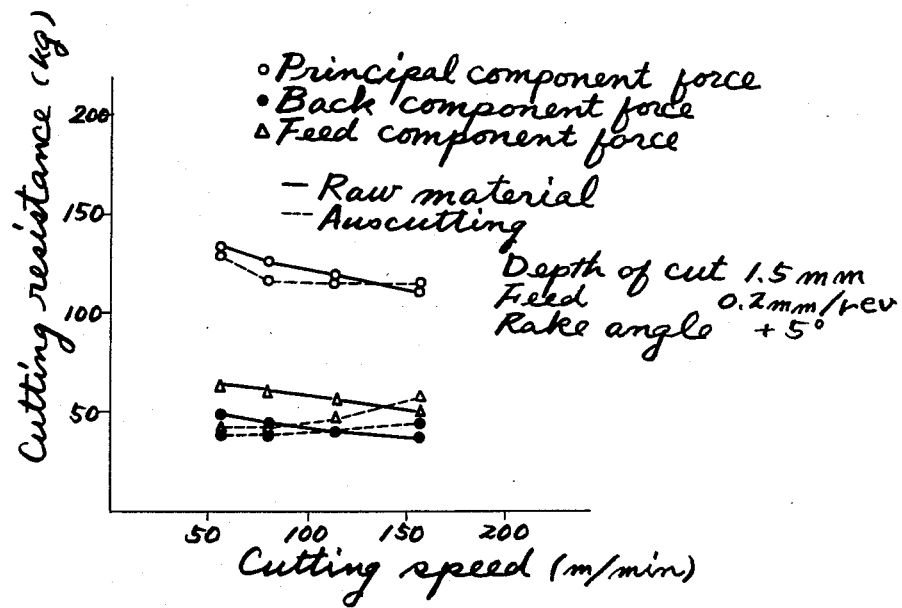

A hollow cylindrical workpiece (steel SUJ-3) measuring 40 mm in outer diameter, 20 mm in inner diameter and 100 mm in length was heated 850° C × 30 minutes, quenched in a salt bath at 200° C and isothermally retained (for about 2 minutes) to assume a supercooled austenite state. The temperature at which the workpiece was withdrawn was about 220° C. Immediately thereafter, it was chucked on a lathe where its outer diameter surface was then turned (auscut). In order to know the machinability, the tool was set on a power tool meter to measure the cutting resistance. For comparison purposes, an annealed material (raw material) of SUJ-3 was turned at room temperature under the same conditions to measure the machining resistance. Throwaway tips were used for the tools, the front rake being +5°. The results, as shown in FIGS. 5 through 7, indicated that when the depth of cut was 0.5 mm and the feed was 0.2 mm/rev, the auscutting was superior to the turning of the raw material for any of the turning rates in that the principal component force, feed component force and back component force were all lower and hence the machinability was satisfactory. Even when the depth of cut was increased to 1 mm and then to 1.5 mm, the machinability was still better than that of the raw material for a range of turning rate between 50 m/min and 110 m/min. The foregoing refers to turning at temperatures (from 220° C to 180° C) above the Ms point in the completely supercooled austenite state. In order to know what would happen at temperatures just below the Ms point, a magnetic transformation detector was placed in contact with the workpiece to measure the transformation to martensite while turning the workpiece. It was found that when several % transformation to martensite took place, the turning resistance was more or less high and yet satisfactory turning was possible but that when 20% or more transformation took place (the corresponding temperature being 120° C), the turning resistance was extremely high and turning was impossible under the same turning conditions. Further, the hardness of the workpiece as allowed to cool to room temperature subsequent to auscutting was HRC 65-64, indicating that the workpiece had been fully quench hardened. The surface roughness of the workpiece as auscut was better than that of the raw material.

The worked surface roughness obtained by the above described turning operation is 10-30 μ, so that when it is desired to have a better worked surface, finishing by grinding becomes necessary. However, the technical concept of the present invention may be further developed to carry out a series of operations ending in grinding concurrently with heat-treatment to thereby efficiently provide a steel machine part of good quality.

Figure 9:
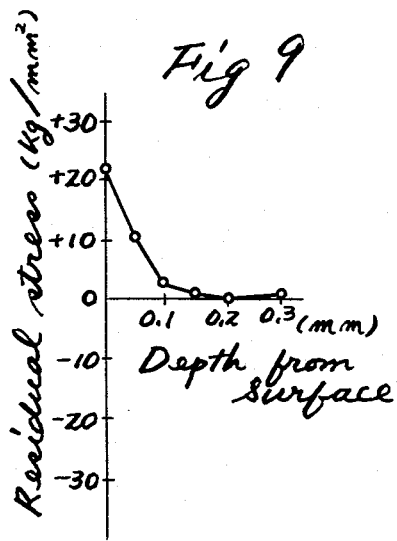
FIGS. 8 and 9 are views for explanation of another embodiment of said first form of the present invention.
Figure 8:
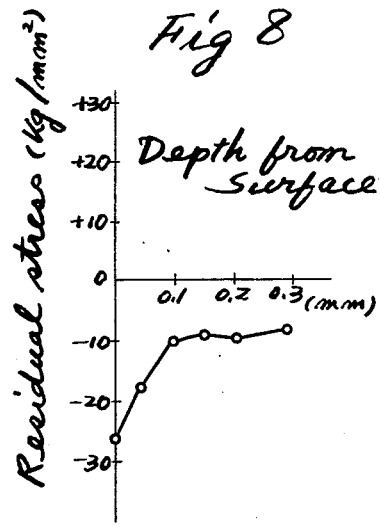

The temperature cycle is substantially the same as those shown in FIGS. 3 and 4 and a detailed description thereof is omitted, but a concrete experimental example thereof is given below with reference to FIGS. 8 and 9 and photomicrographs A and B showing metal structures.

A hollow cylindrical workpiece (steel SUJ-3) measuring 40 mm in outer diameter, 20 mm in inner diameter and 100 mm in length was heated 850° C × 30 minutes, quenched in a salt bath at 230° C and isothermally retained (for about 2 minutes) to assume a supercooled austenite state. The temperature at which the workpiece was withdrawn was about 250° C. Immediately thereafter, it was set on a grinder where it was then subjected to traverse grinding (ausgrinding). When the amount to be ground was set at 0.5 mm in terms of diameter and the amount of feed was placed under a constant pressure by means of hydraulic pressure and the workpiece was axially fed, it was possible to grind a length of 100 mm in 7-8 seconds. In contrast, it took 10 seconds to grind a quenched steel (hardness HRC 64) of the same shape under the same conditions, and it may be said that the ausgrinding is superior in that the grindability is high. Further, when the workpiece was allowed to cool to room temperature after ausgrinding, its hardness was HRC 64-65, indicating that it had been fully quench hardened. The residual stress in the surface layer at that time was measured by X-rays. As a result, as shown in FIG. 8 and Photomicrograph, it was found that the residual stress was a compressive one and there was observed no abnormal structure in the surface layer. In contrast, in the case of the conventional quenched steel ground article, as shown in FIG. 9 and Photomicrograph B, there was observed a tensile residual stress of about 20 Kg/mm² in the surface layer and there was also observed an abnormal structure of the order of about 10 μ (white layer).

As described above, the grinding of conventional quenched steels has a limit in efficiency and continued grinding beyond that limit would cause grinding burn, resulting in a tensile residual stress and abnormal structure, which are undesirable from the standpoint of quality. On the other hand, in the case of the ausgrinding according to the present invention, even if continued grinding is performed, no abnormal structure is created and a compressive residual stress is produced, thus providing increased efficiency and improved quality. Further, since heat-treatment and grinding can be performed at the same time, the merits regarding materials saving, energy saving and labor saving are high. Further, a method is possible in which ausgrinding is performed subsequent to ausforming in the course of quench cooling, and another method is possible in which grinding is performed in the course of quench cooling subsequent to rolling. Therefore, the invention is very useful for use as a method of working precision parts of high tenacity steel.

Second Form of the Invention

Bearing steel Class 3 (SUJ-3) was hot forged to form a steel machine part, the heat of forging was utilized to spheroidize the steel structure in the course of quench cooling and cutting was performed in the supercooled austenite region, such experiment being repeatedly conducted. The steel machine parts thus obtained exhibited machinability which compared well with that of annealed materials. When they were further cooled to room temperature, there was obtained a high hardness of above Rockwell C 60. In addition, the cutting is performed in the austenite region, it is hereinafter referred to as auscutting.

The conventional process requires heating and cooling processes many times as follows: (steel blank) → (forge rolling) gradual cooling almost to room temperature (annealing) gradual cooling to room temperature (turning) → (quenching) → (tempering) → (grinding). In contrast, in the auscutting method according to the present invention, the required processes are as follows:

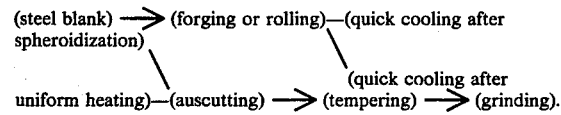

Figure 10:
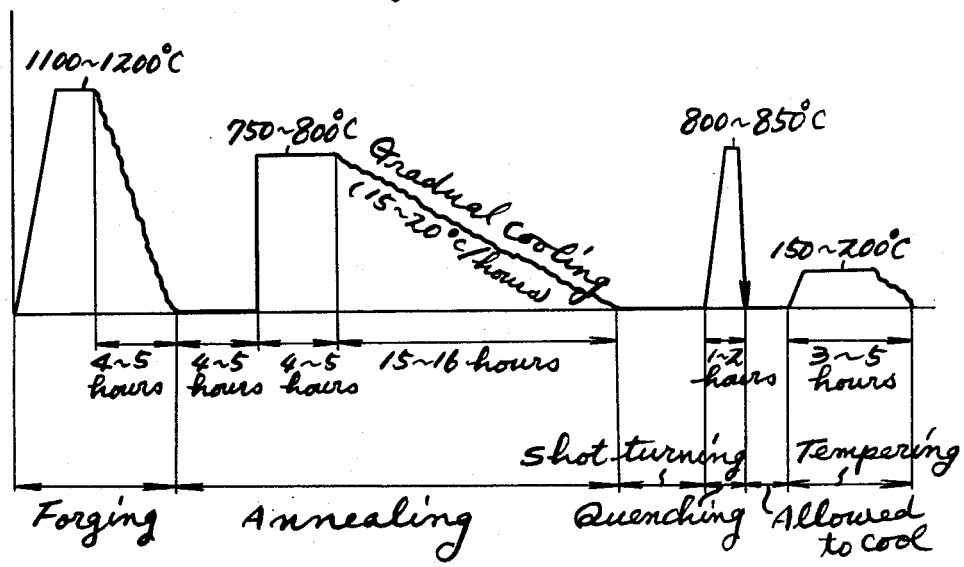
FIGS. 10 and 11 are views for explanation of a second form of the present invention.
Figure 11:
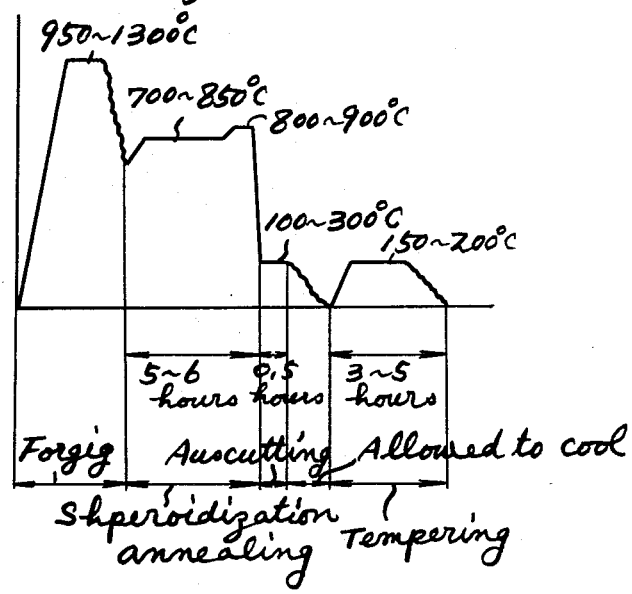

This provides remarkable improvements as seen in FIGS. 10 and 11 in which the conventional and present methods are depicted in terms of temperature cycles.

Thus, in the conventional temperature cycle shown in FIG. 10, the steel machine part is first heated to 1,100°-1,200° C and then forged or rolled to form an intermediate blank. This intermediate steel machine part is then heated to 750°-800° C taking 4-5 hours, gradually cooled for 15-16 hours at a rate of 15°-20° C per hour for annealing, shot turned after cooling, quenched again at 800°-850° C for about 1-2 hours, allowed to cool and tempered at 150°-200° C for 3-5 hours. In contrast, in the temperature cycle shown in FIG. 11 according to the present invention, the steel machine part is heated to 950°-1,300° C, formed by forging or rolling, and, without being cooled once to ordinary temperature, it is isothermally retained at 700°-850° C, where necessary, for spheroidization of cementite, whereupon it is uniformly heated to the quenching temperature in the austenite region above the A1 transformation point, quickly cooled in a cooling medium to a temperature of 100°-300° C in the vicinity of or above the Ms point, cut (auscut) in an isothermally retained or air cooled condition within an ensuing period of about 30 minutes, allowed to cool, and tempered at 150°-200° C for 3-5 hours. In addition, the cooling process may be varied in accord with the kind of steel and the intended object. Further, it goes without saying that instead of reheating for tempering subsequent to cooling to room temperature, as shown in FIG. 11, the auscutting may be followed by isothermal transformation for obtaining a beinitic structure.

A concrete experimental example will now be described. A steel blank was heated to 1,100° C and formed by a forging machine into an intermediate workpiece (steel SUJ-3) measuring 40 mm in outer diameter, 20 mm in inner diameter and 100 mm in length. It was isothermally retained at 800° C, heated to 850° C and quenched in a salt bath at 200° C and isothermally retained (for about 2 minutes) to assume a supercooled austenite state. The temperature at which the article was withdrawn was about 220° C. Immediately thereafter, it was chucked on a lathe where its outer diameter surface was then turned (auscut). In order to know the machinability, the tool was set on a power tool meter to measure the cutting resistance. The results were the same as those in the case of the first form of the invention (shown in FIGS. 5 and 7).

Third Form of the Invention

Using a steel machine part in process of working, made of bearing steel Class 3 (SUJ-3), having a large amount of material to be removed, cooling was interrupted in the course of quench cooling and as a result of an experiment of cutting subsequent to plastic working, this steel machine part exhibited workability and machinability which were not less high than those of annealed materials. In addition, plastic working in the austenite region is referred to as ausforming and cutting in the austenite region auscutting.

The conventional process is carried out in the following sequence: (steel machine part) — (quenching) — (ausforming) — (spark-pressure working or turning) — (tempering) — (grinding). The product which had undergone quenching was very difficult to spark-pressure work or turn. On the other hand, in the ausforming or auscutting method according to the present invention, the sequence is as follows: (steel machine part) — (quenching) — (ausforming) — (auscutting) — (tempering) — (grinding), wherein the workpiece is precision worked almost to the degree of a finished product in the step of ausforming or auscutting, so that the final amount of material to be removed by grinding is very small. This provides remarkable merits as shown in FIGS. 12 and 13 in which the conventional and present invention are depicted in terms of temperature cycles.

Figure 12:
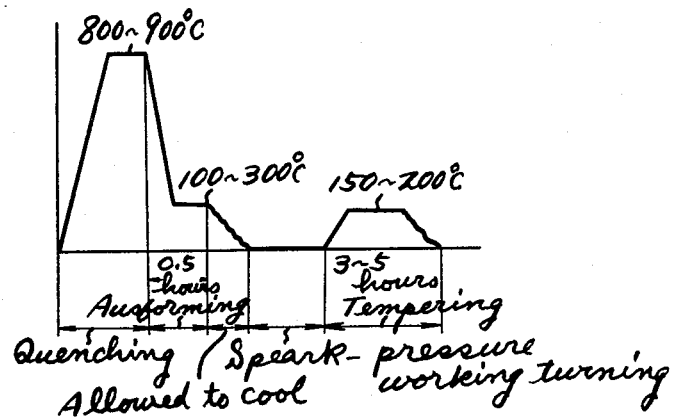
FIGS. 12 and 13 are views for explanation of a third form of the present invention.

Thus, in the conventional temperature cycle shown in FIG. 12, a steel machine part subjected to primary rough working is heated to a quenching temperature of 800°–900° C, whereupon it is quickly cooled in a cooling medium and then plastic worked (ausformed) in the supercooled austenite state at 100°–300° C to go through secondary rough working. Thereafter, it is once allowed to cool. It is then subjected to spark-pressure working or turning, tempering at 150°–200° C and grinding for finish.

Figure 13:
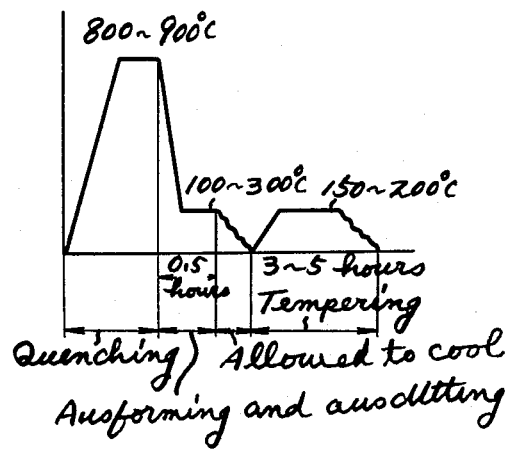

In contrast, in the temperature cycle according to the present invention shown in FIG. 13, the steel machine part is uniformly heated to a quenching temperature of 800°–900° C in the austenite region above the A1 transformation point, whereupon it is quickly cooled in a cooling medium to a temperature in the vicinity of or above the Ms point or plastic worked (ausformed) and cut (auscut) and then allowed to cool, thereby completing quench hardening. Thereafter, it is tempered at 150°–200° C for 3–5 hours. In addition, it goes without saying that instead of tempering by reheating subsequent to cooling to room temperature, auscutting may be followed by isothermal transformation for obtaining a beinitic structure. A concrete experimental example of said cutting (auscutting) is given. A hollow cylindrical workpiece (steel Class SUJ-3) measuring 40 mm in outer diameter, 20 mm in inner diameter and 100 mm in length was heated 850° C × 30 minutes and quenched in a salt bath at 200° C and isothermally retained (for 2 minutes) to assume a supercooled austenite state. The temperature at which the article was withdrawn was about 220° C. Immediately thereafter, it was chucked on a lathe where its outer diameter surface was then turned (auscut), while in order to know the machinability, the tool was set on a power tool meter to measure the cutting resistance. The results were the same as those in the case of the first form of the invention shown in FIGS. 5 through 7.

I claim:

1. A method of working steel machine parts comprising uniformly heating a steel bank to an elevated temperature in the range 950°–1300° C, subjecting the heated steel blank at the elevated temperature to a plastic working operation to produce a steel blank suitable for use as a steel machine part, continuously cooling the worked steel blank from the working temperature to a temperature in the range 700°–850° C, subjecting the cooled steel blank to isothermal retention in the cooled temperature range for spheroidization of cementite, uniformly heating the cooled steel blank to a predetermined quenching temperature, said quenching temperature being selected in accordance with the kind of steel used for the blank, placing the heated steel blank in a cooling medium and quickly quench cooling the steel blank to a temperature in the vicinity of the Ms point of the steel, subjecting the cooled steel blank to a machining or cutting operation while the steel blank is at a temperature preceding the temperature at which hardening will occur, and thereafter permitting the worked steel blank to cool to room temperature.

2. A method of working as set forth in claim 1, wherein the machining is a turning operation.

3. A method of working as set forth in claim 1, wherein the machining is a grinding operation.

4. A method of working as set forth in claim 1, wherein the machining is a plastic working operation and a subseqent turning operation.

5. A method of working as set forth in claim 1, wherein the machining is a plastic working operation and a subsequent grinding operation.

6. A method of working as set forth in claim 1, wherein the cutting is followed by beinite transformation and then by cooling to room temperature.

7. The product produced by the method of claim 1.

* * * * *